United States Patent
Leger et al.

(10) Patent No.: US 11,661,910 B2
(45) Date of Patent: May 30, 2023

(54) SYSTEM FOR CONTROLLING SPEED TRANSITION AND THRUST VECTORISATION IN A MULTIPLE-SHAPED NOZZLE BY SECONDARY INJECTION

(71) Applicants: CENTRE NATIONAL DE LA RECHERCHE SCIENTIFIQUE, Paris (FR); UNIVERSITE D'ORLEANS, Orleans (FR); UNIVERSITE D'EVRY-VAL D'ESSONNE, Evry (FR)

(72) Inventors: Luc Leger, Saint-Pryve-Saint-Mesmin (FR); Vladeta Zmijanovic, Orleans (FR); Mohamed Sellam, Paris (FR); Amer Chpoun, Saint-Fargeau-Ponthierry (FR)

(73) Assignees: CENTRE NATIONAL DE LA RECHERCHE SCIENTIFIQUE, Paris (FR); UNIVERSITE D'ORLEANS, Orleans (FR); UNIVERSITE D'EVERY-VAL D'ESSONNE, Evry (FR)

( * ) Notice: Subject to any disclaimer, the term of this patent is extended or adjusted under 35 U.S.C. 154(b) by 18 days.

(21) Appl. No.: 17/048,243

(22) PCT Filed: Apr. 18, 2019

(86) PCT No.: PCT/FR2019/050927
§ 371 (c)(1),
(2) Date: Oct. 16, 2020

(87) PCT Pub. No.: WO2019/202269
PCT Pub. Date: Oct. 24, 2019

(65) Prior Publication Data
US 2021/0164418 A1 Jun. 3, 2021

(30) Foreign Application Priority Data
Apr. 18, 2018 (FR) .................................. 1853407

(51) Int. Cl.
*F02K 9/97* (2006.01)
*F02K 1/28* (2006.01)
(Continued)

(52) U.S. Cl.
CPC .................. *F02K 9/97* (2013.01); *F02K 1/28* (2013.01); *F02K 1/30* (2013.01); *F02K 9/82* (2013.01);
(Continued)

(58) Field of Classification Search
CPC ..... F02K 9/82; F02K 9/97; F02K 1/28; F02K 1/30
See application file for complete search history.

(56) References Cited

U.S. PATENT DOCUMENTS 3,228,188 A * 1/1966 Sargent .................... F02K 9/82
60/231
3,394,549 A * 7/1968 Sutor ........................ F02K 9/97
60/770
(Continued)

FOREIGN PATENT DOCUMENTS

EP 2103799 A2 9/2009
EP 2466100 A2 6/2012
(Continued)

OTHER PUBLICATIONS

French Search Report received in French Application No. 1853407 dated Mar. 5, 2019.
(Continued)

*Primary Examiner* — Todd E Manahan
*Assistant Examiner* — Kyle Robert Thomas
(74) *Attorney, Agent, or Firm* — Greer, Burns & Crain, Ltd

(57) ABSTRACT

A mixing tube with multiple shapes is provided, allowing additional injection of gas in order to keep the flow detached from the second shape in an ascent phase and to bring about, in a descent phase, a controlled detachment as a result of the change of slope between the two shapes. A propulsion nozzle for an engine of a spacecraft or aircraft is provided including such a mixing tube and a method for controlling
(Continued)

the speed transition of the propulsion gases in such a nozzle in accordance with the altitude. Also, a method is provided for vectorising the thrust in such a nozzle by radial and asymmetrical injection of gas and a control method which prevents re-attachment of the jet to the second shape of such a propulsion nozzle for an engine of a spacecraft when it is in the take-off or landing phase.

10 Claims, 8 Drawing Sheets

(51) Int. Cl.
  *F02K 9/82* (2006.01)
  *F02K 1/30* (2006.01)
(52) U.S. Cl.
  CPC .. *F05D 2220/323* (2013.01); *F05D 2240/128* (2013.01); *F05D 2250/324* (2013.01); *F05D 2250/713* (2013.01)

(56) References Cited

U.S. PATENT DOCUMENTS

| | | | | |
|---|---|---|---|---|
| 3,925,982 A | * | 12/1975 | Mueller | F02K 9/82 60/242 |
| 4,369,920 A | * | 1/1983 | Schmidt | F02K 9/972 239/127.3 |
| 4,947,644 A | * | 8/1990 | Hermant | F02K 1/30 239/265.17 |
| 2005/0178127 A1 | * | 8/2005 | Dujarric | F02K 9/97 60/770 |
| 2009/0235639 A1 | * | 9/2009 | Kimura | F02K 1/38 60/246 |
| 2011/0017872 A1 | * | 1/2011 | Bezos | B64G 1/62 244/158.9 |

FOREIGN PATENT DOCUMENTS

| | | |
|---|---|---|
| JP | 2006322395 A | 11/2006 |
| JP | 2009222010 A | 10/2009 |
| WO | 2008129372 A2 | 10/2008 |

OTHER PUBLICATIONS

International Search Report and Written Opinion for PCT/FR2019/050927 dated Jul. 16, 2019.
Sauer, R., "Three-dimensional Problems of the Characteristic Theory of Partial Differential Equations," Z. Angnew Math. Mech, 1950, pp. 347-356. (English Abstract).
Van Leer, B., "Towards the Ultimate Conservative Difference Scheme. V. A Second-Order Sequel to Godunov's Method," Journal of Computational Physics 32, 1979, pp. 101-136.
JP2020-5584444: JP Office Action dated Oct. 20, 2022 (5 pages).

* cited by examiner

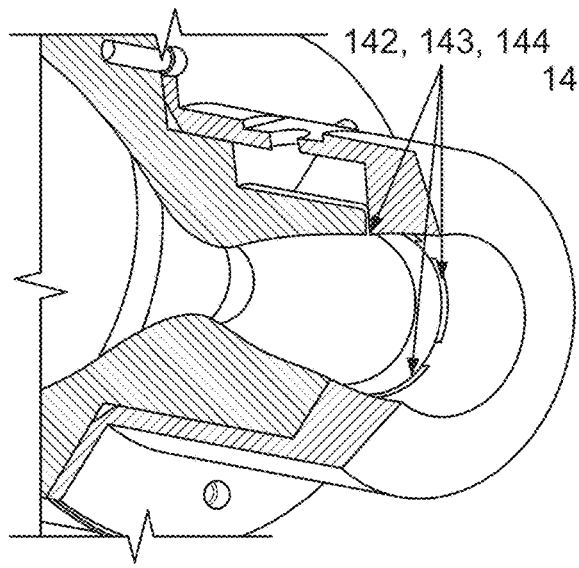
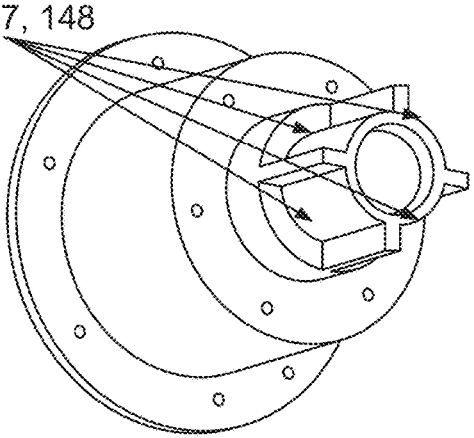
FIG. 8A  FIG. 8B
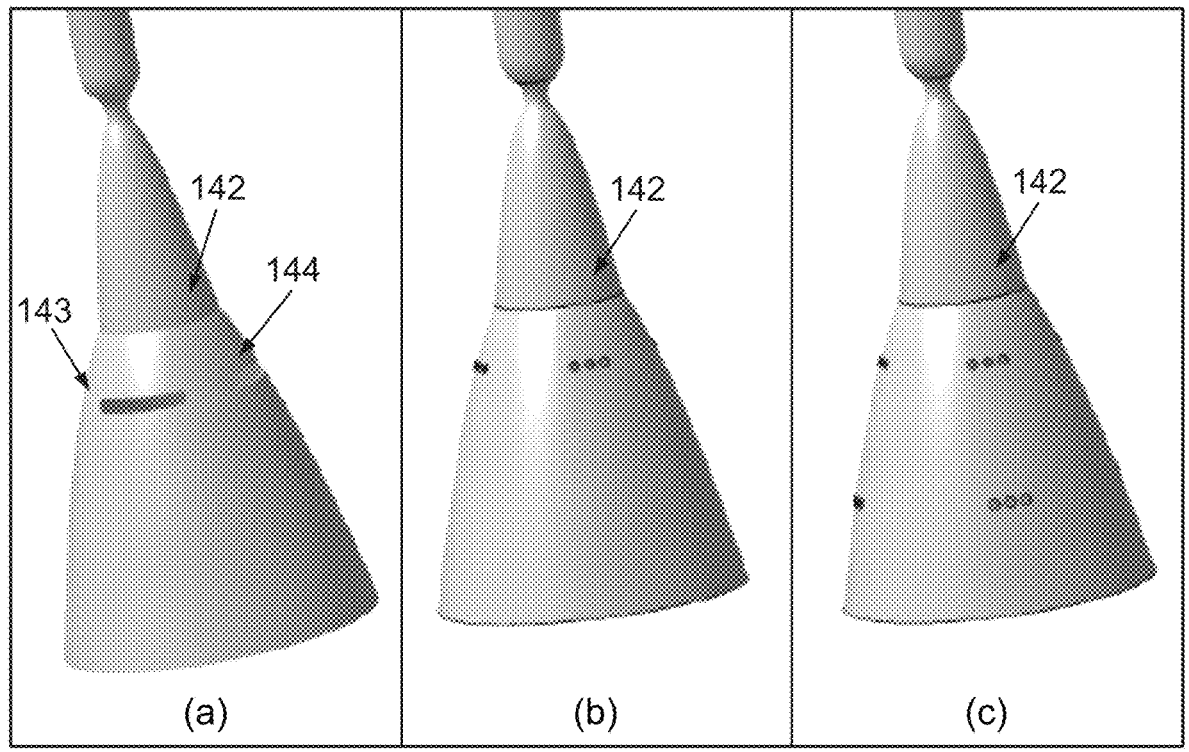
FIG. 9A  FIG. 9B  FIG. 9C

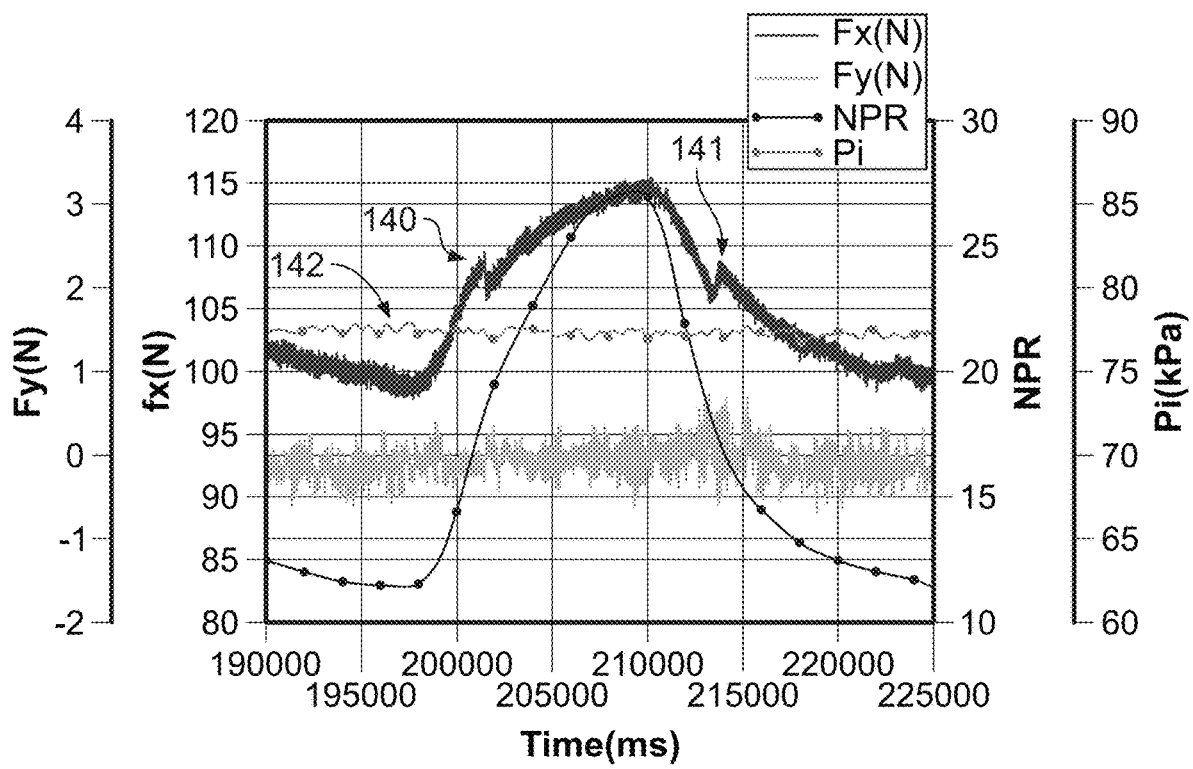
FIG. 14
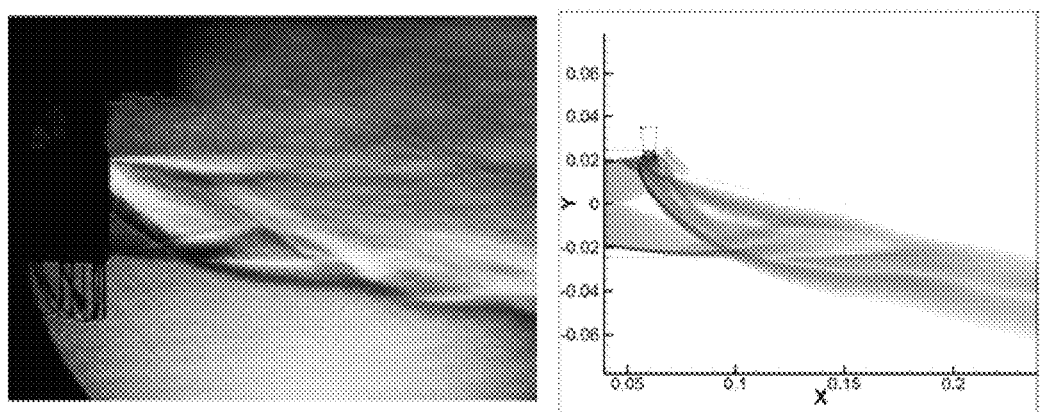
FIG. 15a  FIG. 15b

SYSTEM FOR CONTROLLING SPEED TRANSITION AND THRUST VECTORISATION IN A MULTIPLE-SHAPED NOZZLE BY SECONDARY INJECTION

BACKGROUND

The present invention relates to the field of propulsion nozzles of engines for aircraft or spacecraft propelled by chemical reaction, and more specifically to the field of divergent sections used in these propulsion nozzles.

In the context of optimizing the propulsion of aircraft and spacecraft (in particular space launch vehicles), it is known for a person skilled in the art to seek to optimize the shape of the divergent sections of the nozzles to obtain the maximum thrust. To optimize the thrust of an engine, a person skilled in the art typically adapts the shape of the divergent section of the exhaust nozzle as a function of altitude. With a fixed shape, this adaptation is only effective within a given altitude range. Outside of this range, the performance of the engine deteriorates and limits the payload of the aircraft or launch vehicle.

In this context, double-curved-contours nozzles, by virtue of their ease of implementation, currently represent a promising route to increase the performance of propulsion nozzles[1], [2], [3], [4]. The divergent sections of double-curved-contours nozzles, as illustrated in FIG. 1, are constituted by two profile curvatures 11 and 12 joined by a connecting zone 13. The first curvature 11 (or first curved contour) generates a flow adapted to operation at low altitudes, while the second curvature 12 (or second curved contour) generates a flow adapted to operation at high altitudes. The double-curved-contours nozzles are thus suitable for operation in two different altitude ranges and thus allow better engine output. FIGS. 2a and 2b show the visualization, using "Schlieren" photography, of the flow at the outlet of a double-curved-contours nozzle, respectively at low and high altitude: when the nozzle operates in "low altitude" mode, the flow of the propellant gases is attached to the first curved contour 11 and separated from the second curved contour 12 (cf. FIG. 2a), while it is attached to the first 11 and to the second curved contour 12 when the nozzle operates in "high altitude" mode (cf. FIG. 2b).

However, these double-curved-contours nozzles have a significant problem which currently makes it impossible to use them in aircraft or spacecraft: on the ascent, passing from the low altitude regime (i.e. corresponding to a low expansion ratio NPR (nozzle pressure ratio)), to the high altitude regime (i.e. corresponding to a high NPR) occurs prematurely, i.e. at too low an altitude (NPR too low); on the descent, passing from the high altitude regime to the low altitude regime occurs too late, i.e. at too low an NPR. This non-optimal transition (increasing NPR) or retransition (decreasing NPR) leads to a loss of thrust denoted by reference 34 in FIG. 3a, illustrating the evolution of thrust as a function of altitude, as well as a lateral instability which induces significant side forces referenced 36 in FIG. 3b illustrating the evolution of the side load and the NPR as a function of time.

Thus, in FIG. 3a of the present application which illustrates the evolution of thrust as a function of altitude (and more specifically the evolution of the specific impulse as a function of altitude), the curve 32 represents the theoretical curve which would be present with a single-curved-contour nozzle the curved profile of which would correspond to that of the first curved contour 11 of the double-curved-contours nozzle, while the curve 31 represents the theoretical curve which would be present with a single-curved-contour nozzle the curved profile of which would correspond to that of the second curved contour 12 of the double-curved-contours nozzle (cf. FIG. 1). The ideal transition point is the point 33 (theoretical transition altitude) corresponding to the crossing point of the curves 31 and 32 (in FIG. 3a) as it makes it possible to remain at the best performance of the two curved contours 11 and 12. In curve 35, showing the natural evolution (i.e. with no interference with the flow) of the specific impulse as a function of the altitude of a double-curved-contours nozzle, a loss of thrust (referenced 34 in FIG. 3a) can be seen, as well as a strong side load (referenced 36 in FIG. 3b) because the transition and the retransition take place for too low an an altitude, and in an unstable manner. More specifically, FIG. 3c shows that there is a hysteresis at the level of the evolution of thrust, because the natural passing between the two regimes while the altitude is increasing (transition 37 illustrated in FIG. 3c) does not occur at exactly the same altitude as when the altitude is decreasing (retransition 38 also illustrated in FIG. 3c).

To resolve these defects and drawbacks, the applicant has developed a divergent section comprising a curved contour discontinuity for a propulsion nozzle in which a secondary fluid injection is carried out via one or more orifices or groups of orifices made in the second curved contour of the divergent section, in the downstream portion of the nozzle, which also makes it possible to control the trajectory.

It is known, in particular from applications EP 2103799, FR 2618488 and EP 2137395, for a person skilled in the art to carry out an additional injection, but this injection is carried out in the direction of flow, parallel thereto or tangentially to the wall and always before or in the connecting zone of the two curved contours.

More particularly, European patent application EP 2137395 describes an injection at the change in slope of the divergent section of the nozzle, parallel to the axis of the nozzle in the main direction of flow. The objective is twofold:
- one the one hand, to allow the jet to draw in, by the Venturi effect, air from outside the engine to increase the mass expelled, and thus the thrust of the engine when the flow is attached to the first curved contour; and
- on the other hand, to accelerate the mixing layer (the outer portion of the jet in contact with the fluid comprised between the jet and the wall), so that it indirectly increases the negative pressure gradient and thus prevents the flow from prematurely attaching to the second curved contour.

This indirect technique can require significant energy (indirect action in a shear layer) and induce a long response time. In addition, if it makes it possible to delay the transition from the first to the second curved contour, it does not resolve neither the problem of the existence of side loads during the transition nor the problem of retransition (side load and late retransition).

French patent application FR 2618488 relates mainly to divergent sections of nozzles comprising a removable second curved contour. In this context, it is unnecessary to prevent the flow from prematurely attaching to the second curved contour (as in EP 2137395), since this second curved contour is not (physically) present when not in use. The injection tangential to the wall of the second curved contour situated close to the change in slope is here used to force the reattachment to the second curved contour in order to avoid this transition taking place in dissymmetric way, thus leading to side loads (instability). The principle of operation of the nozzle of FR 2618488 is to force the reattachment by blowing away the high-pressure zone so as to promote homogeneous attachment to the second curved contour. This injection is then exploited to cool the wall.

Patent application EP 2103799 describes an embodiment of a propulsion nozzle for which, firstly, the flow is prevented from attaching prematurely to the second curved contour by accelerating it close to the wall using a secondary injection tangential to the first curved contour by a first family of orifices situated just upstream of the point of change of the curved contour (which will modify the mixing layer as taught by EP 2137395), then secondly, this action is stopped and the reattachment on the second curved contour is controlled, promoting it by blowing tangentially to the second curved contour in the unattached zone by means of a second family of orifices (as taught by FR 2618488).

In these prior art documents [1], [2], [3], the physical phenomena implemented consist of accelerating the boundary layer or the mixing layer, to prevent reattachment (i.e. to avoid attaching too early to the second curved contour in the ascent phase and thus loss of thrust) and to promote a reattachment on the second curved contour (i.e. to obtain a homogeneous transition which avoids side loads). None of these documents teach how to control the retransition (from the second curved contour to the first curved contour) and none of these documents teaches how, with the same injection system, to obtain a thrust vectorization allowing control of the trajectory.

SUMMARY

The present invention has thus developed a double-curved-contours divergent section allowing an additional injection of gas, so that in an ascent phase, the flow is kept detached from the second curved contour, then in a descent phase, a detachment is caused in a controlled and homogeneous manner by making use in both cases of the change in slope between the two curved profiles of the divergent section which promotes this detachment.

Unlike the nozzle of EP 2103799, in the present invention, the objective is not to accelerate the boundary layer, but to reinforce the detachment already present by injecting radially or counterflow into the detached zone to prevent a premature transition on the second curved contour, and to cause a detachment of the second curved contour at the ideal transition point to control the retransition. More specifically, the idea is to locally reinforce, downstream of the inflection point of the profiles (connecting zone of the two curved contours), the adverse pressure gradient, to keep the flow entirely detached from the second curved contour or to cause this detachment. This technique has the advantage of acting directly on the pressure gradient, driving force of the detachment, with very little inertia compared to the tangential injection technique. Moreover, unlike the nozzle as taught in EP 2103799, it is when this reinforcement is no longer sufficient, or when it is stopped, that the flow returns naturally to its attached state on the second curved contour in the case of controlling the transition, and, in the case of controlling the retransition, it is sufficient to stop the injection, once below the natural retransition altitude.

subject of the present invention is thus a divergent section comprising a curved contour discontinuity for a propulsion nozzle of an engine for aircraft or spacecraft propelled by chemical reaction, said nozzle being a nozzle having rotational symmetry about an axis, said engine comprising a reaction chamber producing propulsion gases intended to be ejected outside the nozzle essentially in a main stream, said divergent section comprising starting from the nozzle throat:
  a first portion comprising a first wall having a first surface of revolution about the axis of the nozzle, so that said first wall has a first curved profile in an axial plane, said first curved profile being suitable for generating a flow of said propulsion gases adapted to operate at low altitudes,
  a second portion having a total length L, which is connected to said first portion at a connecting zone defining a curved contour discontinuity, said second portion comprising a second wall having a second surface of revolution about the axis of the nozzle, so that said second wall has a second curved profile in an axial plane, said second curved profile being suitable for generating a flow of said propulsion gases adapted to operate at high altitudes, and
  a device for controlled injection of at least one additional jet of gas into the main stream of propulsion gases exhausted by the nozzle,
said divergent section being characterized in that said controlled injection device is connected to one or more orifices or group of orifices produced axisymmetrically in said second wall of said divergent section, so that the injection of the additional jet of gas is carried out radially or inclined counterflow to the main stream, said orifice or orifices being arranged therein at a distance d from said connecting zone comprising a curved contour discontinuity, which is equal to or less than 95% of the total length L of said second portion and greater than 1% of the total length L of said second portion.

Additional jet of gas, inclined counterflow to the main stream, means, within the meaning of the present invention, an injection of gas directed towards the nozzle throat so that the angle formed between the direction of the main stream (or injection direction) and that of the additional jet to the nozzle is comprised between 90° and 180°.

Low altitude means, within the meaning of the present invention, an altitude situated between the mean sea level and an altitude situated below the natural transition altitude (Atn, reference 34 FIG. 3a) of the flow regime of the propulsion gases in a given divergent section. In this case, the flow regime is called "low altitude regime".

Natural transition altitude (Atn) of the flow regime of the propulsion gases in a given divergent section means, within the meaning of the present invention, the altitude at which there is a natural passing from a flow regime for low altitudes to a flow regime for high altitudes, i.e. without additional injection of gas into the main stream of gas exhausted by the nozzle.

High altitude means, within the meaning of the present invention, an altitude situated above the natural transition altitude (Atn) of the flow regime of the propulsion gases in a given divergent section. In this case, the flow regime is called "high altitude regime".

Group of orifices means, within the meaning of the present invention, configurations constituted by at least three groups of orifices each constituted by at least one orifice and regularly spaced apart.

The distance d may be adapted to each nozzle so as to be as large as possible for promoting efficient trajectory control, while in the case of the retransition control, allowing the detachment to be located on the curved contour discontinuity.

Advantageously, it would also be possible to equip said nozzle with several controlled injection devices, arranged at successive different distances d with the aim of avoiding the reattachment to the second curved contour downstream of the primary injection.

According to a first embodiment of the divergent section according to the invention, the controlled injection device may comprise only a single orifice consisting of a slot having the form of a ring extending over the entire circumference of the second wall situated at the distance d from the connecting zone comprising a curved contour discontinuity, the width of the orifice making it possible to obtain a flow rate reaching up to 20% of the mass flow rate of the propulsion gases in the nozzle with an ejection speed that is subsonic or above.

According to a second embodiment of the divergent section according to the invention, the controlled injection device can comprise at least three orifices or groups of orifices having identical shape and dimensions, these orifices being regularly spaced apart along the circumference of the second wall which is situated at the distance d from said connecting zone comprising a curved contour discontinuity.

According to a third embodiment of the divergent section according to the invention, the divergent section can have several controlled injection devices situated at successive different distances d making it possible to prevent the reattachment on the second curved contour downstream of the primary injection.

Advantageously, the injection device of the divergent section according to the invention can also comprise one or more feeding chambers each connected with an orifice of the injection device and arranged upstream of said injection orifices to homogeneously inject the additional jet of gas into the divergent section.

The additional jet of gas can originate from the reaction chamber or other tanks that are optionally already present, for example in the case of propulsion by combustion, of tanks of combustion agent or fuel, as shown diagrammatically in FIGS. 4a and 4b respectively, or auxiliary tanks annexed or added specifically for the use of said invention as shown diagrammatically in FIG. 4c.

Advantageously, the gas of the additional jet can originate from the reaction chamber (as shown diagrammatically in FIG. 5a) and will be equipped with a feeding chamber allowing homogeneous injection (as shown in FIG. 5b).

A subject of the present invention is also a propulsion nozzle of an engine for aircraft or spacecraft propelled by chemical reaction, the nozzle comprising:
  a convergent portion receiving the propulsion gases produced in said reaction chamber,
  a nozzle throat, and
  the divergent section according to the invention connected to the nozzle throat.

Another subject of the present invention is a method for controlling the transition of the propulsion gas flow regime in a divergent section comprising multiple curved contours of a propulsion nozzle of an engine for an aircraft or spacecraft as a function of whether the altitude of the aircraft or of the spacecraft increases or decreases, said method comprising, in the case in which the altitude increases, the following steps:
  said engine is equipped with a propulsion nozzle according to the invention;
  just before the natural transition altitude is reached, gas is injected radially into the nozzle via the controlled injection device; and
  the injection is maintained until the altitude of the aircraft or of the spacecraft reaches a transition altitude called optimal transition altitude;

said method comprising, in the case in which the altitude decreases, the following steps:
  said engine for a spacecraft is equipped with a propulsion nozzle according to the invention;
  at the optimal transition altitude, gas is injected into the nozzle via said controlled injection device so as to force the detachment of the main stream from the second wall; and
  the injection is maintained until the altitude of the aircraft or the spacecraft passes below said natural transition altitude, which guarantees the absence of instability after the injection stops.

Optimal transition altitude means within the meaning of the present invention, the regime change altitude making it possible to avoid the loss of thrust (as illustrated in FIGS. 3a and 3c).

Another subject of the present invention is a method for thrust vectorization in a divergent section comprising multiple curved contours of a propulsion nozzle of an engine for an aircraft or spacecraft, the method comprising the following steps:
  said engine is equipped with a propulsion nozzle according to the invention provided with a divergent section according to the second embodiment according to the invention (additional gas injection device provided with several injection orifices);
  when it is necessary to correct the trajectory, gas is injected radially and in dissymmetrical way through the orifices, while varying the injection flow rates from one orifice to another, so as the make the flow of the main stream of propulsion gas, as well as the pressure which it imposes on the wall of the nozzle, dissymmetrical and thus vectorize the thrust.

Thus, in the case of a flow attached to the first curved contour ("low altitude" regime), the jet is impacted in its free portion (after the change in slope) but inside the nozzle: a dissymmetry of the jet is obtained using a fluid obstacle. In the "high altitude" regime, a partial detachment of the flow is caused (on a portion of the internal surface of the nozzle) to obtain a dissymmetry in the flow and in the distribution of pressure on the wall.

The nozzle according to the invention can in particular be used, during take-off and landing phases, to prevent combustion instabilities or instabilities induced by the proximity of the ground causing a temporary regime transition.

The injection of the additional jet of gas thus makes it possible to guarantee that the flow is not going to attach on the second curved contour and thus makes it possible to be sure that these instabilities are not going to provoke a temporary regime change.

Another subject of the present invention is a method for controlling the reattachment of the jet onto the second curved contour of a divergent section comprising multiple curved contours of a propulsion nozzle for an engine of a spacecraft when the spacecraft is in the take-off or landing phase, said method comprises the following steps:
  said engine for a spacecraft is equipped with a propulsion nozzle according to the invention;
  When the engine is switched on, gas is injected radially into the nozzle via the controlled injection device until a sufficient altitude is reached ensuring the absence of instability;
  At very low altitude, during the landing phase, gas is injected radially into the nozzle via said controlled injection device until the engine is turned off.

BRIEF DESCRIPTION OF THE DRAWINGS

Other advantages and features of the present invention will result from the following description, given by way of non-limitative example and made with reference to the attached figures and to the corresponding examples:

FIGS. 8a and 8b are diagrammatic representations of a nozzle equipped with a double-curved-contours divergent section and an injection system, according to the second embodiment of the divergent section according to the invention (pluralities of injection orifices): the secondary injection is carried out through four orifices (visible in FIG. 8a) each having their feeding chamber (visible in FIG. 8b);

FIG. 9 shows a diagram illustrating the use of different types of orifices; the injection can be carried out through several orifices (FIG. 9a) or groups of orifices (FIG. 9b, 9c) carried out in dissymmetrical way in the second curved contour radially or slightly inclined counterflow;

FIG. 14 shows the evolution of the secondary injection pressure Pi (measured in the feeding chamber in kPa), of the thrust Fx (in N), of the side load Fy (in N) as well as of the NPR over time;

FIG. 15 shows the visualization obtained by schlieren photography (a) and by numerical simulation (b), of a flow at the outlet of a divergent section comprising a single curved contour of a propulsion nozzle known from the prior art with a radial secondary injection carried out through a single circular orifice.

The identical elements shown in FIGS. 1 to 15 are identified by identical numerical references.

FIGS. 1 to 5 are explained in the description of the invention corresponding to the prior art.

FIGS. 6 to 9 are described in more detail in the following part of the description, relating to the detailed description of the double-curved-contours divergent sections according to the invention (three embodiments) and of a nozzle according to the invention.

FIGS. 10 to 15 are described in more detail in the following examples, which illustrate the invention without limiting the scope thereof.

DETAILED DESCRIPTION

Figure 6:
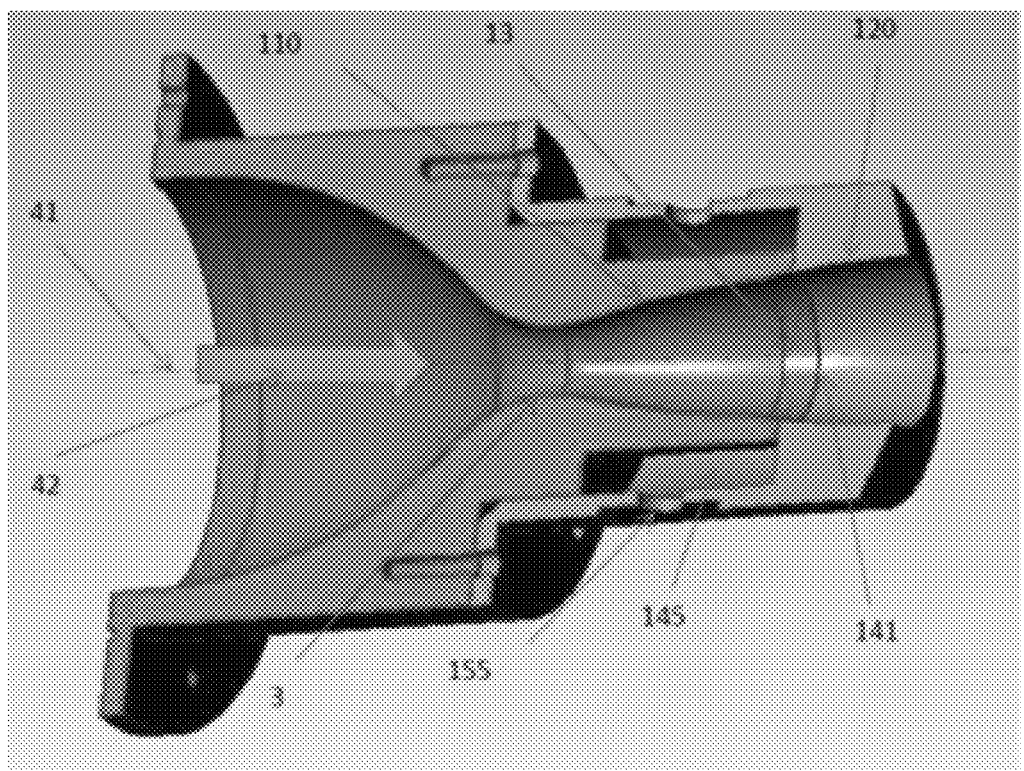
FIG. 6 represents a diagrammatic view of an example of a nozzle equipped with a divergent section comprising a curved contour discontinuity and a secondary injection system, according to the first embodiment of the divergent section according to the invention (a single injection orifice).

FIG. 6 represents a diagrammatic view of an example of a nozzle 4 equipped with a divergent section 1 comprising a curved contour discontinuity according to the first embodiment according to the invention (a single injection orifice), forming part of a propulsion system (shown on its test stand in FIG. 7) for an aircraft or spacecraft propelled by chemical reaction comprising a high-pressure chamber 70 (upstream) coupled with an injection nozzle 4. The nozzle 4 is a nozzle having rotational symmetry about an axis 41 (FIG. 6). The high-pressure gas is expanded and ejected towards the outside through the nozzle 4 essentially in a main stream 42 (FIG. 6). The divergent section 1 comprises from the nozzle throat 3:

a first portion 11 comprising a first wall 110 having a first surface of revolution about the axis of the nozzle 41, so that the first wall 110 has a first curved profile (or first curved contour) in an axial plane, a second portion 12 having a total length L, is connected to said first portion 11 at a connecting zone 13 defining a curved contour discontinuity, the second portion 12 comprising a second wall 120 having a second surface of revolution about the axis of the nozzle 41, so that the second wall 120 has a second curved profile (or second curved contour) in an axial plane, and also a device 14 for controlled injection of at least one additional jet of gas into the main stream of gas 42 exhausted by the nozzle 4.

The injection of the fluid may be carried out by an orifice (141, FIG. 6) or more orifices or group of orifices (142, 143, 144: FIG. 8a) each having their feeding chamber (146, 147, 148 to 89: FIG. 8b), or also by several groups of orifices (FIG. 9b, 9c) produced axisymmetrically in the second curved contour 120, so that the additional injection of the additional jet of gas is carried out radially or slightly inclined counterflow. The orifices are arranged, for the first two embodiments (illustrated in FIG. 6 on the one hand, and FIGS. 8, 9a and 9b on the other hand) at a distance d from the connecting zone 13 comprising a curved contour discontinuity, in such a way that the injection allows, in the case of the high altitude operation regime (attached to the second curved contour) to the shock of detachment to stabilize over the connecting zone 13.

In the third mode of the present invention (plurality of groups of orifices: FIG. 9c), several injection systems may be used so as to prevent reattachment on the second curved contour 120 downstream of the primary injection.

EXAMPLES

Figure 7:
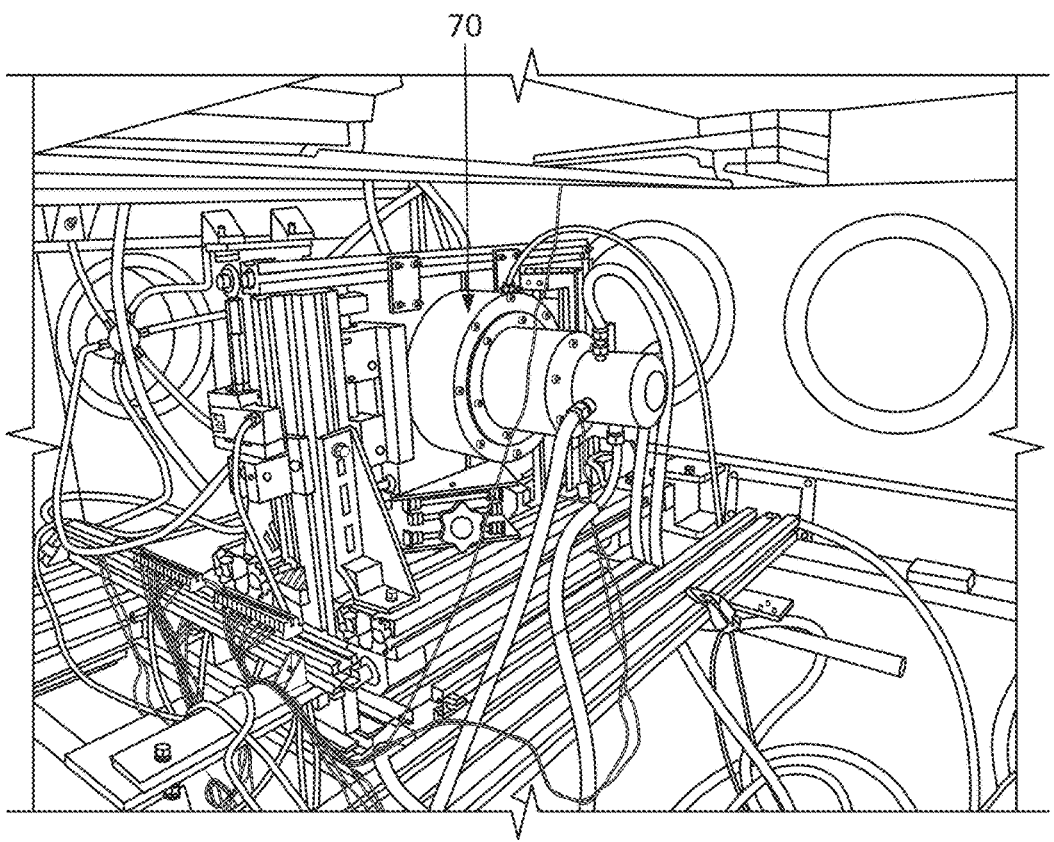
FIG. 7 is a photograph of the nozzle illustrated in FIG. 6 with a high-pressure chamber 70 supplying the nozzle with propulsion gas, the nozzle and the high-pressure chamber being mounted on an experimental test stand.
Figure 10:
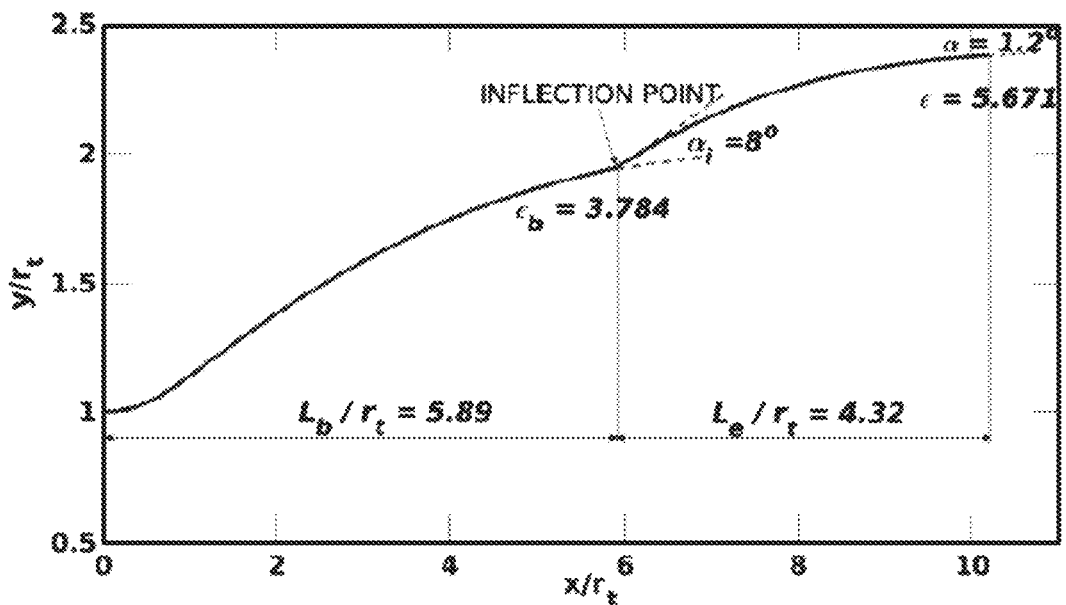
FIG. 10 is a diagram (with dimensions) defining the profile of an example of a double-curved contours divergent section according to the invention used for simulations and experiments.

A nozzle according to the invention (as shown in FIGS. 6 and 7) is used, produced as a function of the experimental capabilities of the test stand. The initial conditions (upstream of the nozzle throat) are 3.5 bar and 290 K, the nozzle throat has a radius $r_t$ of 8.5 mm, which gives a theoretical flow rate of 0.2285 kg/s. The profile of the nozzle is obtained using the inverse characteristics method initiated by the Sauer method[5] applied to transonic flow. The ideal nozzle is truncated (length $L_b$) to obtain an output angle of 4.4°. The extension (length $L_e$) is also determined by the method of characteristics so as to have a constant pressure at the wall. The angle at the connecting zone 13 is 8°. These data are summarized in FIG. 10.

Figure 11A:
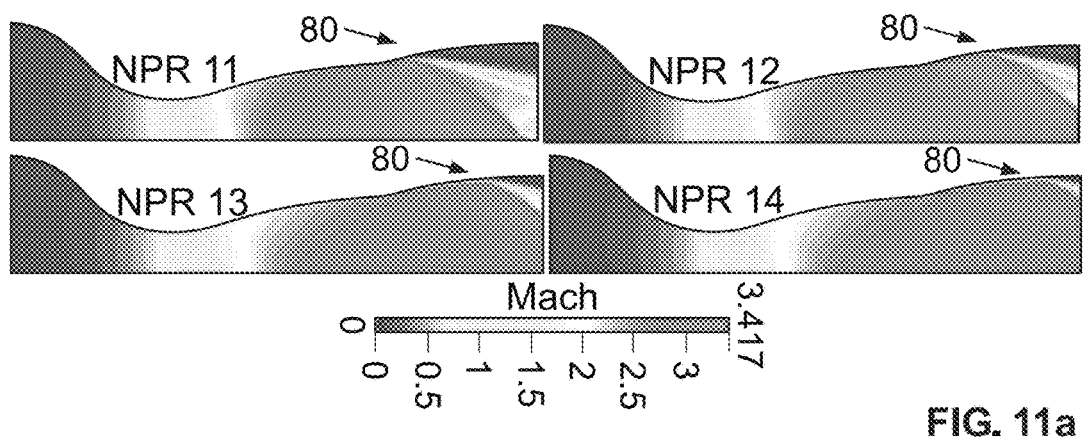
FIG. 11 shows the Mach fields obtained by numerical simulation inside a nozzle according to the invention for different NPRs in the case of an inactive (a) and active (b) secondary injection the flow rate of which corresponds to 2% of the main mass flow rate.
Figure 11B:
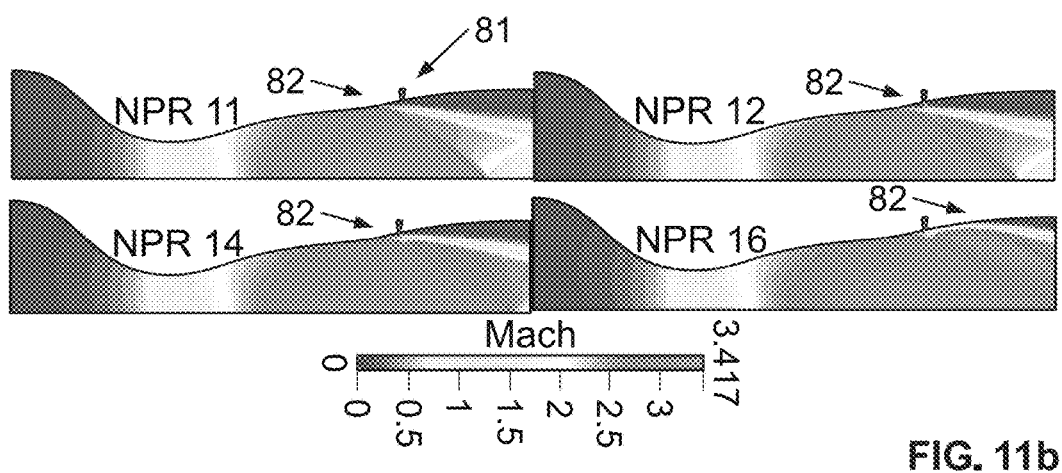

FIG. 11 illustrates the operating principle of the injection system according to the present invention in the case of an increase in the altitude (increasing NPR), without secondary injection (FIG. 11a) and with active secondary injection (FIG. 11b).

This calculation is carried out using the FASTRAN commercial software program written specifically for fluid mechanics applications in respect of fluids compressible at high Mach numbers. It solves Reynolds-averaged Navier-Stokes equations (RANS) by the finite volumes method, the non-viscous terms being calculated using the Van Leer[6] scheme with a third-order Osher flux limiter. The turbulence model used is the K-Omega SST-Menter. Multi-domain meshing is used. The initial conditions are: temperature 290 K, 3.5 bar. The injection is situated at $x/r_t=6.483$, x being the distance between the injection and the nozzle throat and $r_t$ being the radius of the nozzle throat. The injection orifice has a width of 0.5 mm, the injection pressure is 0.4 bar, and the injected flow rate is approximately 2% of the main stream rate of the nozzle (flow rate of the propulsion gas).

In FIG. 11a showing the field of Mach numbers (speed/speed of sound) for different NPRs (altitude), it can be seen that, without secondary injection, the detachment point denoted 80 (FIG. 11a) displaces downstream as the NPR increases. From NPR=11, the shock of detachment is attached at the second curved contour, while at NPR=14 it has practically reached the outlet lip of the second curved contour. FIG. 11b shows the field of Mach numbers for different NPRs in the case of an active secondary injection 81 (2% of the primary mass flow rate). It shows that it is possible to push back the reattachment altitude onto the second curved contour. In fact, the detachment point 82 is in this case maintained on the connecting zone 13 comprising a curved contour discontinuity up to an NPR of 14, while without injection, this detachment point 80 is practically situated at the outlet of the second curved contour 120. For an NPR of 16, the secondary injection is no longer significant enough (in terms of flow rate) to continue to maintain the detachment, the flow thus reattaches behind the injection 81.

Figure 12:
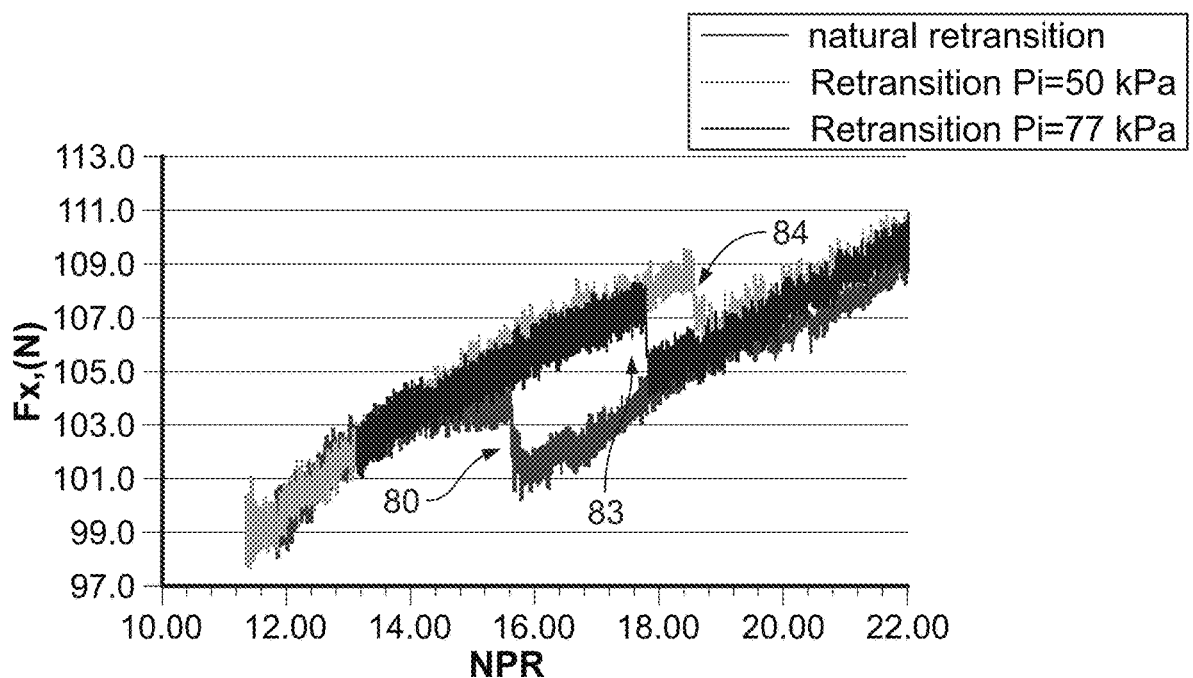
FIG. 12 shows the evolution of thrust Fx as a function of the NPR, for an increasing NPR, for different secondary injection pressures.
Figure 13:
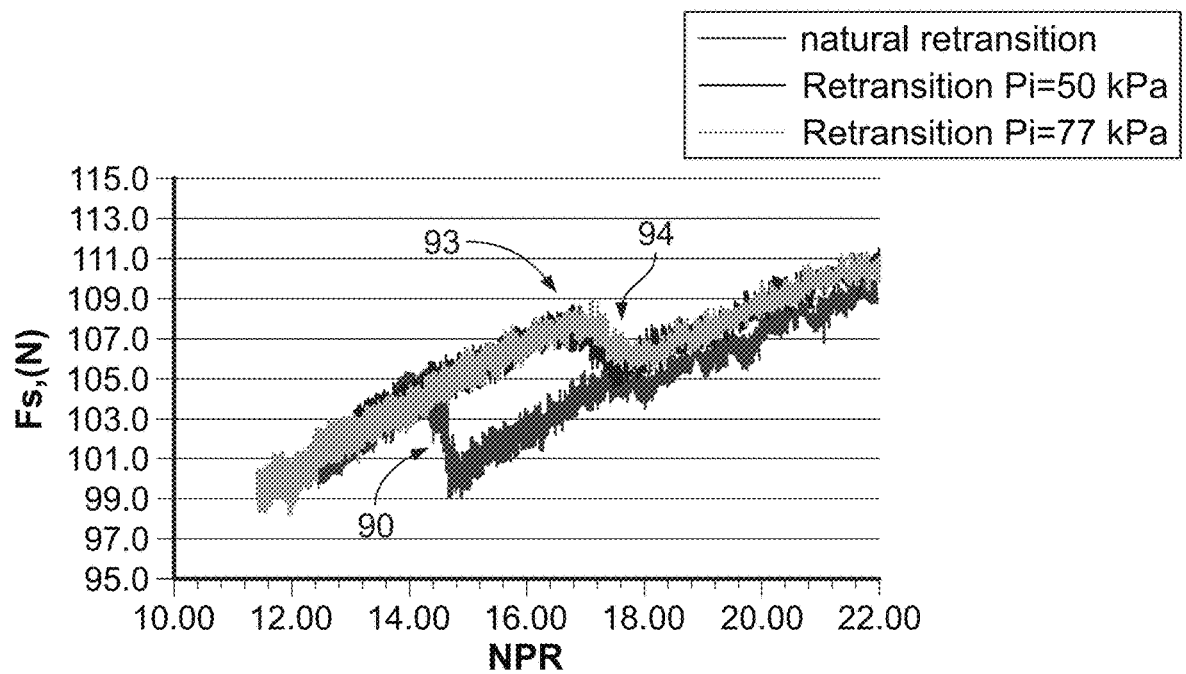
FIG. 13 shows the evolution of thrust Fx as a function of the NPR, for a decreasing NPR, for different secondary injection pressures.

This predictive calculation is verified experimentally using the set-up shown in FIG. 7 as illustrated in FIGS. 12 and 13, which show respectively the evolution of thrust Fx as a function of the NPR in the case of an increasing (FIG. 12) and decreasing (FIG. 13) NPR for different secondary injection pressures (measured in the feeding chamber 145):

In FIG. 12 it can be seen that a secondary injection delays the transition to a higher NPR (83 with a secondary injection at 50 kPa and 84 with a secondary injection at 77 kPa), compared with the natural transition NPR 80.

In FIG. 13 it can be seen that a secondary injection triggers the retransition to a higher NPR (93 with a secondary injection at 50 kPa, and 94 with a secondary injection at 77 kPa), compared with the natural retransition 90, which is the advantageous effect sought. The secondary injection induces not only a more favourable transition and retransition, but also a reduction, or even an elimination of damaging side loads.

Figure 1:
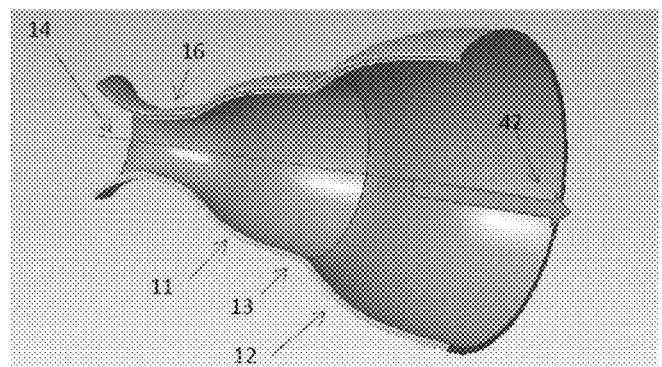
FIG. 1 represents a diagrammatic perspective view of a double-curved contours propulsion nozzle.
Figure 2A:
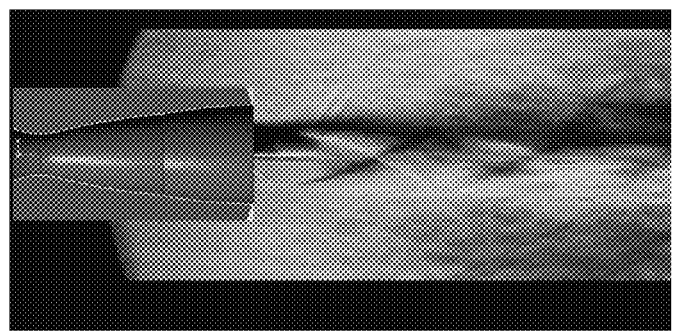
FIG. 2 shows the visualization obtained by schlieren photography of a flow at the outlet of a divergent section comprising double-curved contours of a propulsion nozzle known from the prior art, for operation at low altitude (first portion 2a showing that the flow remains attached to the first curved contour and detached from the second curved contour) and operation at high altitude (second portion 2b showing that the flow remains attached to the first and second curved contours)
Figure 2B:
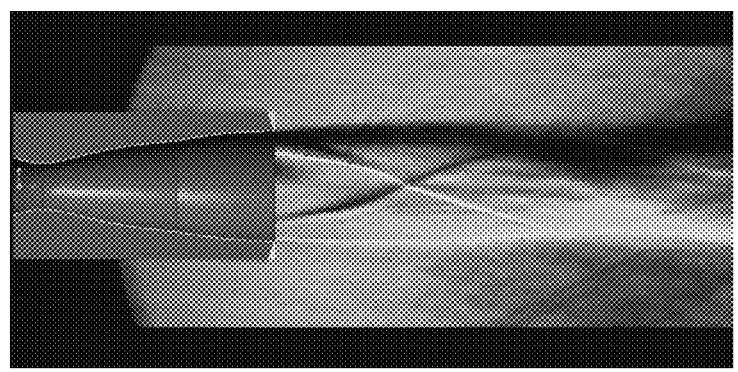
Figure 3A:
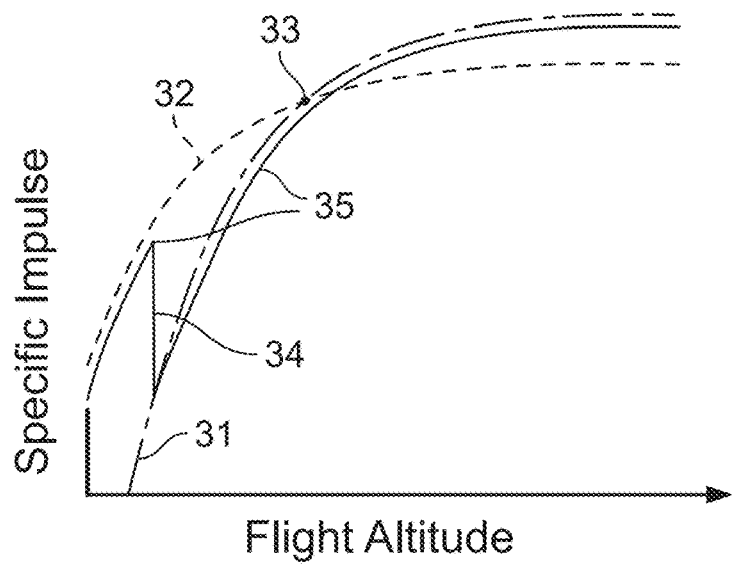
FIGS. 3a and 3c are curves showing the evolution of thrust as a function of altitude (specific impulse as a function of the NPR, while FIG. 3b represents the evolution of the side load at the retransition then at the transition.
Figure 3B:
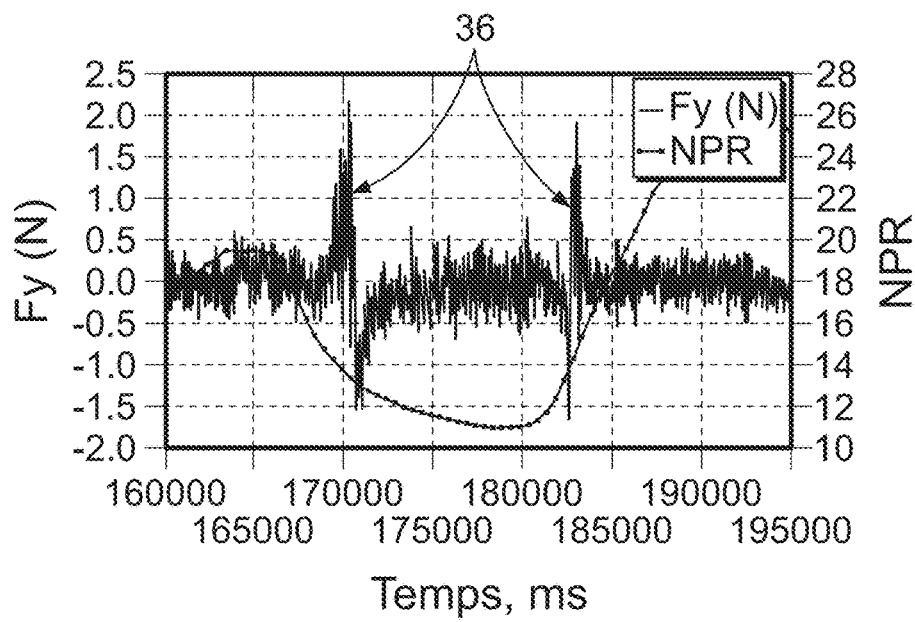
Figure 3C:
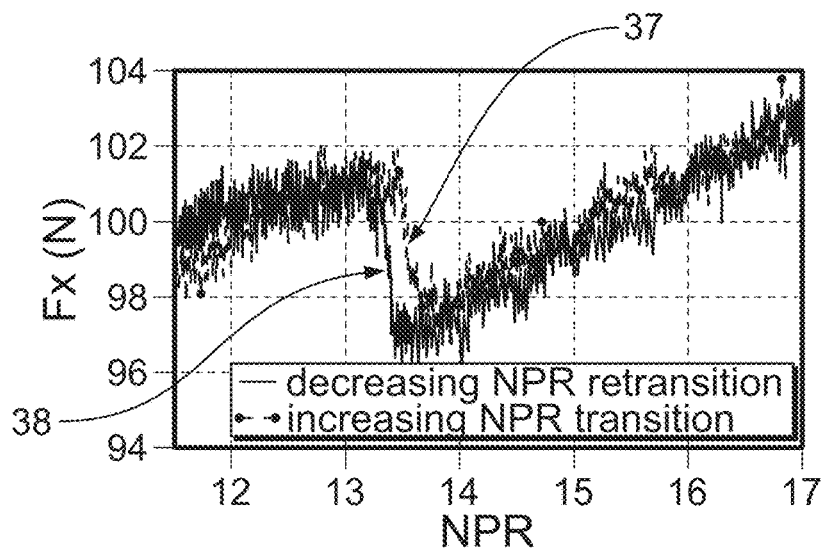
Figure 4A:
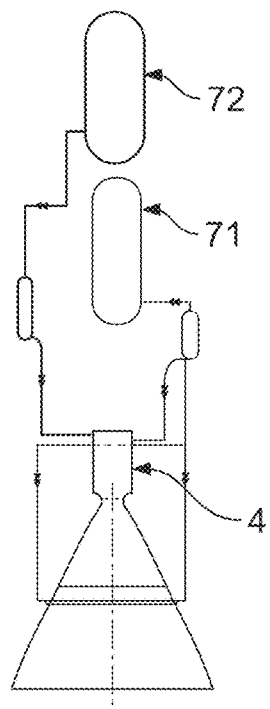
FIG. 4 diagrammatically represents a system for propulsion by combustion equipped with a double-curved-contours nozzle equipped with a secondary injection system according to the first embodiment of the divergent section according to the invention (a single injection orifice), the secondary injection gas originating (FIG. 4a) either from the fuel tank, or from the combustion agent tank (FIG. 4b), or from an auxiliary tank (FIG. 4c)
Figure 4B:
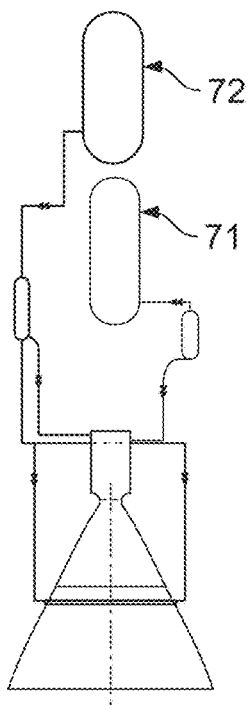
Figure 4C:
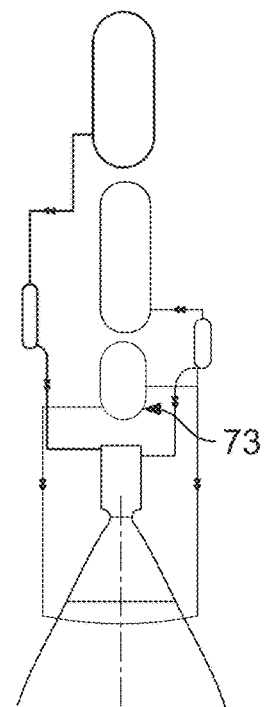
Figure 5A:
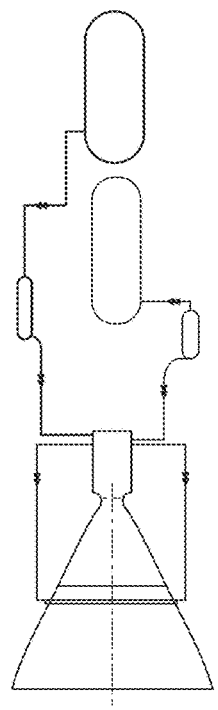
FIG. 5 diagrammatically represents a system for propulsion by combustion equipped with a double-curved-contours nozzle equipped with a secondary injection system according to the first embodiment of the divergent section according to the invention (a single injection orifice), the secondary injection gas originating from the combustion chamber without feeding chamber (a) and with feeding chamber (b).
Figure 5B:
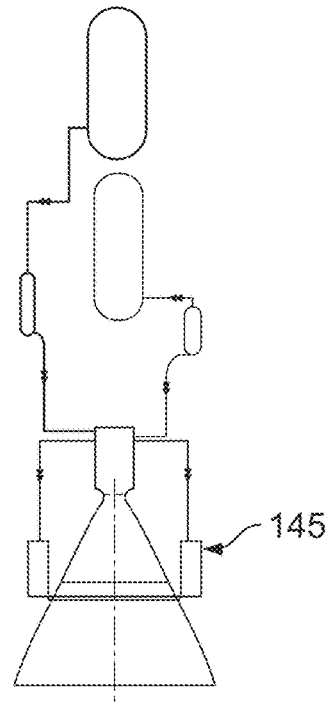

FIG. 14 shows the evolution of the secondary injection pressure Pi (measured in the feeding chamber), of the thrust Fx, of the side load Fy as well as of the NPR over time during an experiment. A drop 140 in thrust at the increase of NPR, and an increase 141 in thrust at the decrease of NPR is observed, which indicates that the injection pressure is not high enough (curve 142) to reach the optimal operation described previously. Despite this, the side load peak is no longer observed as in the case without injection (peaks referenced 36 in FIG. 3b), which is the advantageous effect sought.

FIG. 15 shows the visualization obtained by schlieren photography (portion a in the Figure) and by numerical simulation (portion b in the Figure), of a flow at the outlet of a divergent section comprising a single curved contour of a propulsion nozzle known from the prior art with a radial secondary injection carried out via a single circular orifice with a diameter of 5.8 mm. The injection is situated at 88% of the total length of the divergent section, the mass flow rate of the secondary injection is 8% of the main stream rate of propulsion gas. In FIG. 15 it is observed that the secondary injection causes a partial detachment of the flow in the nozzle. This injection thus causes a dissymmetry in the flow and in the pressure distribution on the wall. The thrust force obtained is thus no longer aligned with the axis of the nozzle. Because of this, it becomes possible to control the trajectory of an aircraft or of a spacecraft without other specific trajectory control systems.

REFERENCE LIST

[1] European patent application EP 2103799 by MITSUBISHI HEAVY INDUSTRIES.
[2] French patent application FR2618488 by Société Européenne de Propulsion (SEP).
[3] European patent application EP2137395 by MOSCOW AVIATION INSTITUTE.
[4] American patent U.S. Pat. No. 3,394,549 by AMERICAN ROCKWELL CORPORATION.
[5] R. Sauer, "*Dreidimensionale Probleme der Charakteristikentheorie partieller Differential-gleichungen*", Zeitschrift für angewandte Mathematik und Mechanik, Vol 30, pp 347-356, November-December 1950.
[6] Van Leer, B. (1979), "*Towards the Ultimate Conservative Difference Scheme, V. A Second Order Sequel to Godunov's Method*", J. Com. Phys., 32, 101-136.

The invention claimed is:

1. A divergent section comprising multiple curved contours for a propulsion nozzle of an engine for aircraft or spacecraft propelled by chemical reaction, the propulsion nozzle being a nozzle having rotational symmetry about an axis, the engine comprising a reaction chamber producing propulsion gases intended to be ejected outside the propulsion nozzle in a mainstream, the divergent section comprising a nozzle throat, the divergent section further comprising:
a first portion comprising a first wall connecting the nozzle throat to a connecting zone, said first wall having a first surface of revolution about the axis of the propulsion nozzle, so that said first wall has a first curved profile in an axial plane, said first curved profile being suitable for generating a flow of the propulsion gases adapted to operation at low altitudes;
a second portion having a total length L, which is connected to said first portion at the connecting zone defining a curved contour discontinuity, said second portion comprising a second wall extending from the connecting zone to an outlet to exhaust the flow of the propulsion gases to an ambient environment, said second wall having a second surface of revolution about the axis of the nozzle, so that said second wall has a second curved profile in an axial plane, the connecting zone defining a change in slope between the first curved profile and the second curved profile, said second curved profile being suitable for generating a flow of the propulsion gases adapted to operation at high altitudes, wherein said connecting zone extends between said first portion and said second portion such that said curved contour discontinuity promotes detachment of the flow of the propulsion gases; and
a device for controlled injection of at least one additional jet of gas into the main stream of the propulsion gases exhausted by the propulsion nozzle;
said divergent section further comprising said controlled injection device having one or more orifices or a group of orifices produced axisymmetrically in said second wall of said divergent section, so that the injection of the additional jet of gas is carried out radially or inclined counterflow to the main stream, each of said orifices being arranged therein at a distance d from said connecting zone comprising the curved contour discontinuity, wherein d is equal to or less than 95% of the total length L of said second portion and greater than 1% of the total length L of said second portion so that the injection of the additional jet of gas:
keeps the flow of the propulsion gases detached from the second curved contour by making use of the change in slope between the first curved profile and the second curved profile when moving from operation at low altitudes to operation at high altitudes; and
causes detachment of the flow of the propulsion gases from the second curved contour by making use of the change in slope between the first curved profile and the second curved profile when moving from operation at high altitudes to operation at low altitudes.

2. The divergent section according to claim 1, wherein said controlled injection device comprises a single orifice consisting of a slot having the form of a ring extending over the entire circumference of the second wall situated at the distance d from said connecting zone comprising the curved contour discontinuity, the width of the orifice making it possible to obtain a flow rate reaching up to 20% of the mass flow rate of the propulsion gases in the nozzle with an ejection speed that is subsonic or above.

3. The divergent section according to claim 1, in which said controlled injection device comprises at least three orifices having identical shape and dimensions, said orifices being regularly spaced along the circumference of the second wall which is situated at the distance d from said connecting zone comprising the curved contour discontinuity.

4. The divergent section according to claim 1, according to which said controlled injection device also comprises one or more feeding chambers, each communicating with an orifice of said injection device to homogeneously inject the additional jet of gas into said divergent section.

5. The divergent section according to claim 1, comprising several controlled injection devices situated at successive different distances d.

6. The divergent section according to claim 1, according to which the additional jet of gas injected by said controlled injection device originates from said reaction chamber of the engine, or from combustion agent or fuel tanks, or auxiliary tanks annexed.

7. A propulsion nozzle of an engine for aircraft or spacecraft propelled by chemical reaction, said nozzle comprising:
a convergent portion receiving the gases produced in said reaction chamber;
a nozzle throat; and
a divergent section connected to the nozzle throat wherein the divergent section is as defined according to claim 1.

8. A method for controlling the transition of the propulsion gas flow regime in a divergent section comprising multiple curved contours of a propulsion nozzle of an engine for an aircraft or spacecraft as a function of whether the altitude of the aircraft or of the spacecraft increases or decreases,
said method comprising, in the case in which the altitude increases, the following steps:
said engine is equipped with a propulsion nozzle as defined according to claim 7;
just before the natural transition altitude is reached, gas is injected radially into said nozzle via said controlled injection device; and
the injection is maintained until the altitude of the aircraft or of the spacecraft reaches a transition altitude called optimal transition altitude,
said method comprising, in the case in which the altitude decreases, the following steps:
said engine for a spacecraft is equipped with said propulsion nozzle as defined according to claim 7;
at the optimal transition altitude, gas is injected into said nozzle via said controlled injection device so as to force the detachment of the main stream from the second wall; and
the injection is maintained until the altitude of the aircraft or of the spacecraft passes below said natural transition altitude.

9. A method for controlling the reattachment of the flow of the propulsion gases on the second curved contour of a divergent section comprising multiple curved contours of a propulsion nozzle of an engine of a spacecraft when the spacecraft is in the take-off or landing phase, the method comprising the following steps:
said engine for a spacecraft is equipped with a propulsion nozzle as defined according to claim 7;
when the engine is switched on, gas is injected radially into said nozzle via said controlled injection device until a sufficient altitude is reached guaranteeing the absence of instability; and
at very low altitude, during the landing phase, gas is injected radially into said nozzle via said controlled injection device until the engine is switched off.

10. A method for thrust vectorization in a divergent section comprising multiple curved contours of a propulsion nozzle of an engine for an aircraft or spacecraft, said method comprising the following steps:
- said engine is equipped with a propulsion nozzle as defined according to claim 1 and further including said controlled injection device comprises at least three orifices having identical shape and dimensions, said orifices being regularly spaced along the circumference of the second wall which is situated at the distance d from said connecting zone comprising a curved contour discontinuity, and also including a convergent portion receiving the gases produced in said reaction chamber; said nozzle throat; and said divergent section connected to the nozzle throat;
- when it is necessary to correct the trajectory of said aircraft or spacecraft, gas is injected radially and in dissymmetric way through said orifices, while varying the injection flow rates from one orifice to another, so as to make the flow of the main stream of propulsion gas and the peripheral pressure dissymmetrical and vectorize the thrust.

\* \* \* \* \*